United States Patent [19]

Hardy et al.

[11] Patent Number: 4,944,038

[45] Date of Patent: Jul. 24, 1990

[54] METHOD AND APPARATUS FOR UTILIZATION OF DUAL LATENCY STATIONS FOR PERFORMANCE IMPROVEMENT OF TOKEN RING NETWORKS

[75] Inventors: R. H. Stephen Hardy, North Vancouver; Ian R. Radziejewski, Coquitlam, both of Canada

[73] Assignee: Simon Fraser University, Burnaby, Canada

[21] Appl. No.: 201,073

[22] Filed: May 31, 1988

[30] Foreign Application Priority Data

Jun. 1, 1987 [CA] Canada .................................. 538535

[51] Int. Cl.$^5$ .............................................. H04J 3/16
[52] U.S. Cl. .................................................. 370/85.5
[58] Field of Search ...................... 370/86, 87, 88, 89, 370/85, 85.5; 340/825.05

[56] References Cited

U.S. PATENT DOCUMENTS

| | | | |
|---|---|---|---|
| Re. 31,852 | 3/1985 | Soderblom | 370/86 |
| 4,195,351 | 3/1980 | Barner et al. | 364/900 |
| 4,293,948 | 10/1981 | Soderblom | 370/86 |
| 4,514,841 | 4/1985 | Sem-Sandberg | 370/86 |
| 4,554,673 | 11/1985 | Stevens | 370/86 |
| 4,604,742 | 8/1986 | Hamada et al. | 370/86 |
| 4,623,884 | 11/1986 | Ihara et al. | 370/86 |
| 4,698,804 | 10/1987 | Flores et al. | 370/86 |

OTHER PUBLICATIONS

Schwartz, *Computer Communication Networks Design and Analysis*, Prentice-Hall, p. 275, (1977).
Bux, "Local Area Subnetworks: Performance Comparison," *IEEE Trans. Commun.*, vol. COM-29, No. 10, pp. 1465-1473, (Oct. 1981).
Dixon, "Lore of the Token Ring," *IEEE Network*, vol. 1, No. 1, pp. 11-18, (Jan. 1987).
*An American National Standard, IEEE Standards for Local Area Networks: Token Ring Access Method and Physical Layer Specifications*, ANSI/IEEE Std: 802.5-1985, Publication Number SH09944, IEEE Computer Society Press, pp. 19-76, (1985).
Iyer et al., "FDDI's 100 M-bps Protocol Improves on 802.5 Spec's 4M-bps Limit," *EDN*, pp. 151-160, (May 2, 1985).

*TMS38020 Protocol Handler*, Texas Instruments, p. A-25, (1985).
ADM Applications Engineering, *Applications Seminar, Technology, Circuits, Solutions*, Advanced Micro Devices Incorporated, pp. 127-129, (1986).
Ferguson, "Means Waiting Time for a Token Ring with Station Dependent Overheads," in Pickholtz (ed.), *Local Area and Multiple Access Networks*, Computer Science Press, pp. 43-67, (1986).
Takagi, *Analysis of Polling Systems*, MIT Press, pp. 162-163, (1986).
Everitt, "Simple Approximations for Token Rings," *IEEE Trans. Commun.*, vol. COM-34, pp. 719-721, (Jul. 1986).
Lo; *Performance Evaluation and Comparison of a Token Ring Network with Latency Stations and Dual Latency Stations;* M.A.Sc. Thesis, The University of British Columbia, May, 1988.
IBM Technical Disclosure Bulletin, vol. 29, No. 8, Jan., 1987; Bus Arbiter with Dynamic Priority Adjustment.
Hardy, Radziejewski and Lo; *Utilization of Dual Latency Stations for Performance Improvement of Token Ring Networks;* IEEE Pacific Rim Conference on Communications, Computers and Signal Processing, Jun. 4-5, 1987.
Hardy, Radziejewski and Lo; *Performance Evaluation of a Token Ring Network with Dual Latency Stations;* IEEE INFOCOM '88, New Orleans, Mar., 1988.
Radziejewski; *Design of a Token Ring Network Interface Unit;* B.A.Sc. Thesis, Simon Fraser University, Feb. 1, 1988.

*Primary Examiner*—Joseph A. Orsino
*Assistant Examiner*—Frank M. Scutch, III
*Attorney, Agent, or Firm*—Klarquist, Sparkman, Campbell, Leigh & Whinston

[57] ABSTRACT

This invention is directed to a method and apparatus for improving the performance of a token ring network. More particularly, the method and apparatus involve bypassing the encode-decode step in a station in a token ring network thereby enabling the station to function at a lower latency state whenever the station has an empty message queue. A method of reducing time delay in the stations of a token ring network which comprises bypassing the encode and decode steps in a station whenever that station has an empty message queue.

6 Claims, 4 Drawing Sheets

BLOCK DIAGRAM OF LOW-LATENCY REPEATER CIRCUIT

LOW LATENCY BYPASS CIRCUIT

TIMING DIAGRAM, DUAL LATENCY OPERATION

MEAN WAITING TIMES AT STATION 1 VERSUS RING UTILIZATION, 90% CONFIDENCE INTERVALS, 40 STATIONS, 2 HEAVILY LOADED, 18 LIGHTLY LOADED, 20 UNLOADED.

METHOD AND APPARATUS FOR UTILIZATION OF DUAL LATENCY STATIONS FOR PERFORMANCE IMPROVEMENT OF TOKEN RING NETWORKS

FIELD OF THE INVENTION

This invention is directed to a method and apparatus for improving the performance of a token ring network. More particularly, the method and apparatus involve bypassing the encode-decode step in a station in a token ring network thereby enabling the station to function at a lower latency state whenever the station has an empty message queue.

BACKGROUND OF THE INVENTION

The performance of token ring local networks is adversely affected by the latency or time delay introduced by each station in the network. Station latency is defined as the time delay introduced in passing ring data through a station. Most token ring protocol standards (IEEE 802.5, ANSI X3T9.5) require encoding of each packet before transmission onto the ring. The encoding and decoding operations add significantly to the station latency.

A number of papers and printed materials have been published on this subject. The applicant is aware of the following references which disclose information which is more or less pertinent to the invention that is later disclosed and claimed in this application:

1. M. Schwartz, *Computer Communication Networks Design and Analysis*, Prentice-Hall, 1977, p. 275.
2. 2. W. Bux, "Local Area Subnetworks: Performance Comparison", *IEEE Trans. Commun.*, vol. COM-29, pp.1465-1473, October, 1981.
3. R. C. Dixon, "Lore of the Token Ring", *IEEE Network*, vol. 1, pp. 11-18, January, 1987.
4. IEEE Standard: 802.514 1985 Local Area Networks Token Ring Access Method, Publication Number SH09944, IEEE Computer Society Press, 1985.
5. V. Iyer, S. Joshi, "FDDI's 100 Mbps Protocol Improves on 802.5 Spec's 4 Mbps Limit", *EDN*, May 2, 1985, pp. 151-160.
6. TMS380 Adapter Chipset User's Guide, Texas Instruments Incorporated, 1985, p. A-25.
7. AMD Applications Engineering, *Applications Seminar, Technology, Circuits, Solutions*, Advanced Micro Devices Incorporated, 1986, pp. 127-129.
8. M. J. Ferguson, "Mean Waiting Time for a Token Ring with Station Dependent Overheads", in R. L. Pickholtz (ed.), *Local Area and Multiple Access Networks*, Computer Science Press, 1986, pp. 43-67.
9. H. Takagi, *Analysis of Polling Systems*, MIT Press, 1986, p. 162.
10. David Everitt, "Simple Approximations for Token Rings", *IEEE Trans. Commun.*, vol. COM-34, pp. 719-721, July, 1986.

The applicant is also aware of U.S. Pat. No. Re. 31,852, which is a reissue of U.S. Pat. No. 4,293,948, Olof Soderblom, which appears to be the pioneer patent in the field of token ring networks. This patent is directed to the basic operation of a closed loop data transmission system. The novelty in this invention appears to reside in the arrangement of the network into a loop, the procedure for the exchange of information among stations or terminal units on the network (by the use of framing bits), and by selectively actuating a switching unit which connects or disconnects the station from the network.

No reference or claim is made in Soderblom regarding the use of stations with two latency states to improve the performance of token ring networks.

Another patent of possible relevance is U.S. Pat. No. 4,195,351, Barner et al. The abstract of this patent refers to a data transmission system which includes stations connected in a closed loop configuration with interface capabilities at each station to connect to an external data processor. The network then allows simultaneous transmission of data among processors connected to stations on the loop. No mention is made of the use of stations with two latency states to improve the performance of token ring networks.

The effect of station latency on performance of token ring local networks has been recognized for some time. Schwartz (1 above) recognized the influence of walk-time on the performance of polling systems. Bux (2 above) analyzed the effect of station latency on message transfer delay of token rings and demonstrated the marked increase in delay produced by an increase in latency. More recently, recognition has been given to the effect of protocol design and of detailed station adapter implementation on the transmission delay performance of practical token ring networks. For example, Dixon (3 above) refers to the design of token ring protocols to eliminate practically all logical delay in the attached stations, and describes a principal design objective of token ring protocols as being the minimization of message transmission delays.

SUMMARY OF THE INVENTION

This invention is directed to a method and apparatus for reducing station latency in a token ring network by making use of the fact that whenever the station's message queue is empty, the decoding and encoding steps are bypassed and the station need only repeat the ring data stream. By utilizing the bypass techniques, the station is then able to enter a low latency state whenever it is not required to either search for a free token or to place data onto the ring. This reduced station latency, which is dependent on the state of the message queue, provides a significant reduction in mean waiting time, which is comparable in some cases to that obtained with gated service.

The invention is directed to a method of reducing time delay in the stations of a token ring network which comprises bypassing the encode and decode steps in a station whenever that station has an empty message queue. The station may repeat the data stream of the ring whenever the message queue of that station is empty.

The method of reducing time delay in a token ring network may comprise utilizing in the network stations which have two latency states, one latency state including conventional encoding and decoding steps, and the second latency state bypassing the encoding and decoding steps, said method reducing time delay by utilizing the latency state that excludes the encoding and decoding steps whenever the station has an empty message queue. The token ring network may include at least three stations each with two latency states.

Included in the scope of the invention is an apparatus for reducing station latency in a token ring network which comprises: means for decoding data from the ring after reception by the station; means for encoding data before transmission from the station onto the ring;

and means for bypassing the decoding and encoding means whenever the station has an empty message queue.

The apparatus for reducing latency in a station in a token ring network may comprise: (a) decoding means for decoding data received from the token ring; (b) logic means for separating a timing signal from the data and synchronizing the operations of the interface with the ring network; (c) encoder means for encoding data being transmitted onto the token ring; (d) bus means which connects the decoder means (a), logic means (b), and encoder means (c); (e) bus controller means for controlling the flow of data along the bus means (d); (f) bypass circuit means which enables the decoder means (a), logic means (b), and encoder means (c) to be bypassed as required; (g) repeater means for transmission of encoded data onto the token ring; and (h) logic selector means which enables the station to assume a low latency state by bypassing the decoder means (a), the logic means (b), the encoder means (c), the bus means (d) and the bus controller (e) along bypass means (f) whenever the station has an empty message queue.

The apparatus may include logic means for determining the priority of data that is queued for transmission onto the ring. The repeater means may retime outgoing data bits from the station.

The apparatus may include means for setting required flags for the outgoing data without decoding and re-encoding data bits when the station is in a low latency mode. The repeater means may include means for setting the error bit in the received data, without decoding and re-encoding the data.

DRAWINGS

DETAILED DESCRIPTION OF A SPECIFIC EMBODIMENT OF THE INVENTION

Figure 1:
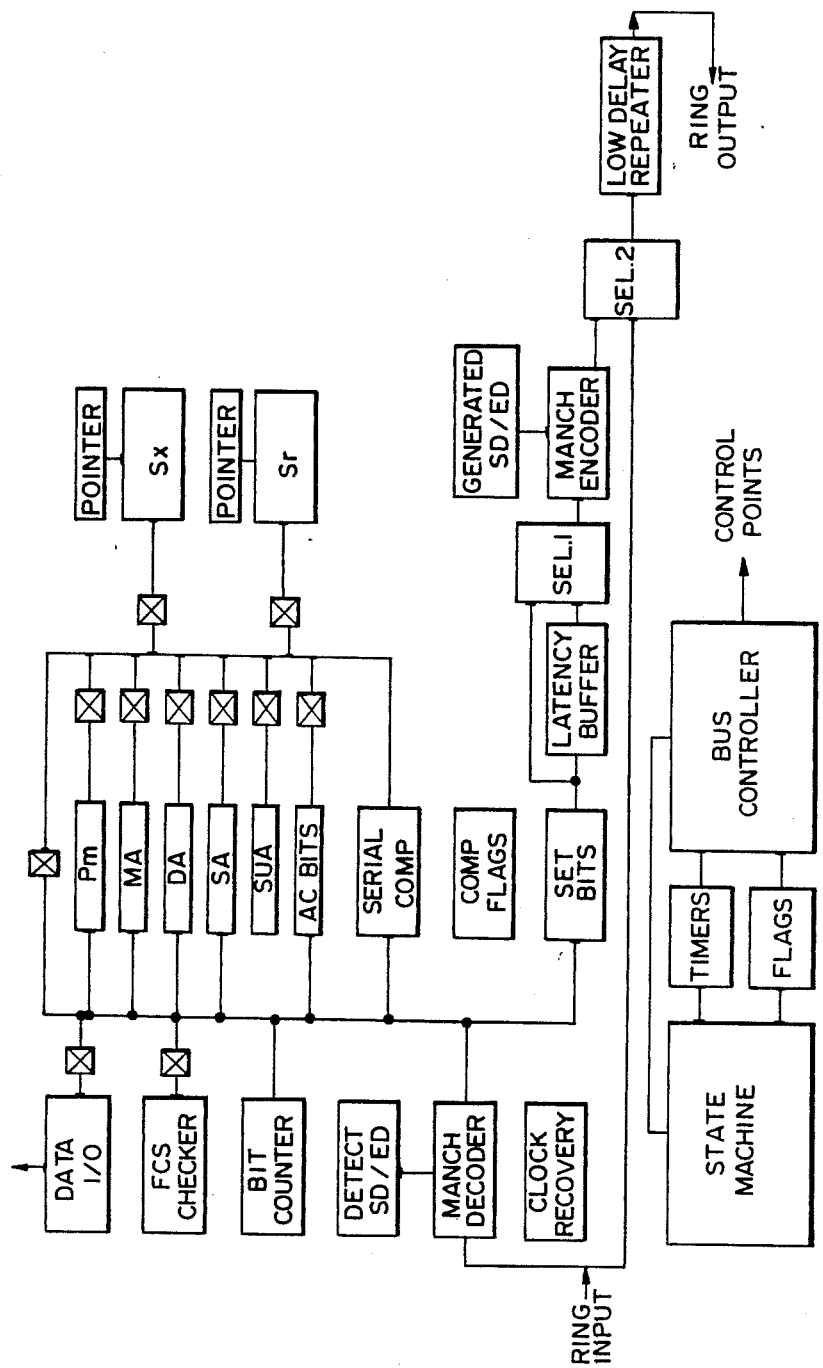
FIG. 1 illustrates a network interface unit block diagram.

The method and apparatus of the invention utilize the bypassing of the encode/decode step whenever the station has an empty message queue, thus providing an reduction in average waiting time and thus a corresponding increase in performance of the station. Implementation details are provided below and demonstrate how the dual station latency method leads to improved performance of a network interface unit based on the IEEE 802.5 token ring protocol. Simulation results are also presented and verify the improvement in performance for ordinary or limited-to-one service. The simulation results are compared to published results for exhaustive and gated service, showing a favourable comparison between the waiting times obtained with dual latency ordinary service, and those obtained with fixed latency, gated service.

Dual Latency Method

A station connected to a token ring network may require differing amounts of delay or latency, depending on the functions it is required to perform at a particular time, or on the aspect of the portion of the protocol it is implementing at a given time. For instance, it would be expected that the required latency when in the repeat state with no messages queued for transmission may be less than the required latency when the station has messages ready for transmission and is scanning the data stream for a free token. In practice, the common token ring protocols are designed to introduce very little logical delay: the principal contributor to station latency is the cumulative effect of gate propagation delays in the station circuitry (3 above). In order to reduce station latency to as low a value as possible, it is necessary to examine the operations performed on the ring data stream as it passes through a station.

Many implementations of ring networks encode the data stream before it is transmitted onto the ring. This encoding is desirable for two reasons. It is necessary to embed the clock signal in the data stream since generally only one serial channel is available. Secondly, it is desirable to ensure that the ring data waveform has a constant, or close to constant, average value (constant dc level). Both these requirements lead to the necessity to encode the data before transmission onto the ring and to decode it again after reception. Ring protocol descriptions typically specify a particular encoding scheme designed to satisfy the above requirements. For instance, the IEEE 802.5 token ring standard (4 above) specifies a differential Manchester encoding scheme while the ANSI X3T9.5 Fiber Distributed Interface (FDDI) proposed standard (5 above) specifies a 4B/5B scheme, which encodes a 4-bit data packet into a 5-bit symbol with an embedded clock. Implementations of these protocols (6 and 7 above) perform decode operations on the ring data immediately after the data stream enters the station, and perform encode operations on the data immediately before it is transmitted onto the ring.

The major portion of the station latency, as described below, is contributed by gate propagation delays in the encoder and decoder. The reduction or elimination of these encoding and decoding delays leads to an improvement in network performance, specifically a reduction in message mean waiting time.

The method described is believed to also be applicable to the ANSI X3T9.5 standard, although different hardware and software specific to that standard would be required.

Implementation of a Dual Latency Network Interface Unit

In order to test the performance of a dual latency station with realistic hardware parameters, the IEEE 802.5 token ring standard (4) was used as the basis for an implementation of a network interface unit utilizing dual latency. The state machine description of the station performance was converted to a logic description. Additional logic was included to implement the low latency function, controlled by the presence or absence of a message queued for transmission. The purpose of this implementation was two-fold; first, to verify that a network interface unit could in fact be developed that would allow the switching of latency states while maintaining compatibility with an accepted protocol standard, and secondly, to obtain measures of the latency improvement that could be obtained using standard integrated circuit technology.

The basic operation of the network interface is specified, in the IEEE 802.5 standard, as a set of three finite state machines. The logic circuitry is a direct implementation of the state diagrams, with the addition of the low latency bypass feature The architecture of the interface we have invented is outlined in FIG. 1. Two one-bit busses interconnect most of the circuit blocks. The bus controller arbitrates the access to the bus, based upon the operation specified by the state machine.

The data input from the ring can take one of two paths through the circuit. In normal operation, the data bits are first decoded and then passed to one or more circuit blocks. The set bits block alters certain bits in the frame such as the token or error flag. The data is then encoded and transmitted into the ring by the repeater circuit.

The input data is received from the ring at the point RING INPUT. This data is applied to the CLOCK RECOVERY circuitry which separates the clock or timing signal from the data. The clock is then used to synchronize the operations of the network interface unit. The input data is also applied to the MANCH. DECODER which decodes the input data. The input data is also applied to the SEL2 circuit which selects the low latency or full latency modes of operation, according to the state of the station's message queue. The output of the MANCH. DECODER is applied to one of the one-bit busses, and to the DETECT SD/ED block which detects the presence of the starting delimiter and the ending delimiter in the data.

The FCS CHECKER calculates the frame check sequence, from the incoming data, and compares against the received frame check sequence. DATA I/O transmits and receives data from the host processor, HOST (LLC).

Block Pm is a register containing the priority of the data unit queued for transmission, as received from the host processor, HOST (LLC). Block MA (My Address) is a register containing the address of the station. Block DA (Destination Address) is a register containing the address of the station to whom the data is addressed. Block SA (Source Address) is a register containing the address of the station which originated the message. Block SUA is a register containing the address of the station immediately upstream of this station. Block AC BITS is a register containing the frame status bits A (Address Recognized) and C (Frame Copied).

Block Sx is a stack of registers containing the transmitted priority values. Its POINTER points to the highest stacked priority value. Block Sr is a stack of registers containing the received priority values. Its POINTER points to the highest stacked received priority value.

Block SERIAL COMP comprises circuitry which compares the contents of the above registers with the incoming data, as defined in the IEEE 802.5 standard. Block COMP FLAGS comprises registers which store the results of the comparison done by the block SERIAL COMP. Block SET BITS sets the appropriate bits in the frame, as defined in the IEEE 802.5 standard. Block LATENCY BUFFER introduces a minimum value of station latency whenever the station is acting as the ring monitor, as defined in the IEEE 802.5 standard. The adjacent block SEL1 selects the buffered or unbuffered data, depending on whether the station is acting as the ring monitor, as defined in the IEEE 802.5 standard.

Block GENERATE SD/ED produces the framing bits required to encode and insert data onto the ring. Block MANCH ENCODER encodes the data into the differential Manchester format. The associated block SEL2 selects the full latency data path or the low latency data path, depending on the state of the message queue. The block LOW DELAY REPEATER re-clocks the outgoing data and sets the flag bits, as necessary when in the low latency mode.

The block STATE MACHINE sequences the operation of the network interface unit through its various states of operation, as defined in the IEEE 802.5 standard. Block TIMERS implements certain time-out functions, as defined in the IEEE 802.5 standard. Block FLAGS sets or resets certain flags, dependent on the state of the STATE MACHINE and the state of the TIMERS. The block BUS CONTROLLER controls the data flow on the two serial busses, dependent on the state of the STATE MACHINE and on the state of the FLAGS and TIMERS. The BUS CONTROLLER performs this function through various CONTROL POINTS on the serial busses. These CONTROL POINTS are indicated by the crossed boxes connected to the busses.

In the low latency mode, all of the circuitry except the repeater is bypassed. A detailed diagram of the FIG. 1 blocks, LOW DELAY REPEATER and associated block SEL2, is shown in FIG. 2.

Figure 2:
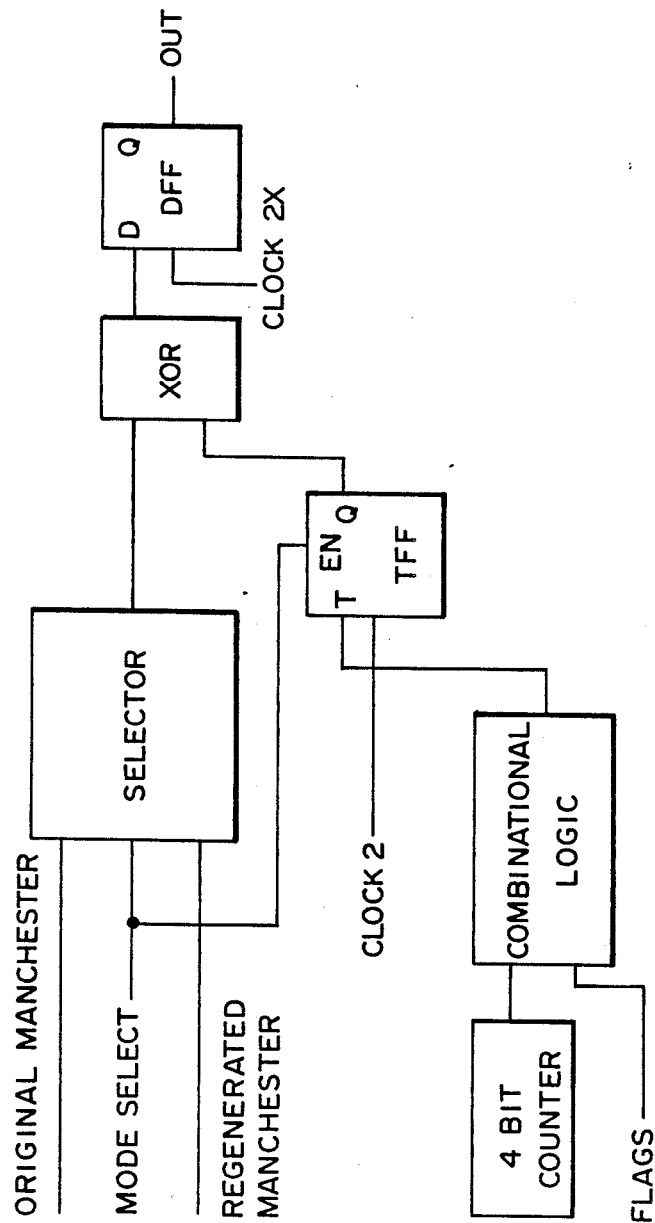
FIG. 2 illustrates a schematic block diagram of a low latency bypass circuit.

With reference to FIG. 2, the input ORIGINAL MANCHESTER corresponds, in FIG. 1, to the RING INPUT. The input REGENERATED MANCHESTER corresponds, in FIG. 1, to the output from the block MANCH ENCODER. The input MODE SELECT, not shown in FIG. 1, is a control input, controlling the selection of either full latency or low latency modes. The block SELECTOR corresponds to the block SEL2 in FIG. 1, connected between MANCH ENCODER and LOW DELAY REPEATER.

The input FLAGS is produced by the block FLAGS in FIG. 1. The block COMBINATIONAL LOGIC combines the input FLAGS with the output from 4 BIT COUNTER to generate an output capable of setting any required flags in the ORIGINAL MANCHESTER data stream, without decoding and re-encoding of the data.

The input CLOCK2 is a timing signal derived from the bit edge signal transitions of the RING INPUT. The block TFF is a toggle flip-flop which changes state in response to the inputs MODE, SELECT, CLOCK2, and the output of COMBINATIONAL LOGIC.

The block XOR is an exclusive-OR logic circuit, which combines the Manchester-encoded data from SELECTOR with the Q output from TFF. The block DFF is a D-type flip-flop which re-clocks the output data bits in order to reduce any phase jitter. The input CLOCK2X is a clock or timing signal, derived from the block CLOCK RECOVERY in FIG. 1, but having a freguency of twice that of the signal recovered by CLOCK RECOVERY. The output OUT corresponds to the output RING OUTPUT in FIG. 1.

The additional D flip-flop at the output of this circuit serves two purposes. Firstly, it ensures that the phase of the output data stream is uniform. Without this extra clocking there would be a sudden phase shift when the station switched from the original Manchester bits to the regenerated bits, or vice versa. A sudden phase shift would disrupt the phase-locked loop of the downstream station and may lead to cycle slips. However, the phase shift between these two data streams still needs to be reasonably small; more specifically, their phase should be slightly ahead of the output clock in order for the flip-flop to clock the bits correctly. This condition implies that the latency of two parts of the circuit should differ by approximately an integral number of bits. For example, the station could have a lower-latency of 0.5 bits and a full latency of 3.5 bits. The flip-flop also removes any output spikes that may result when the Manchester bits are inverted.

Figure 3:
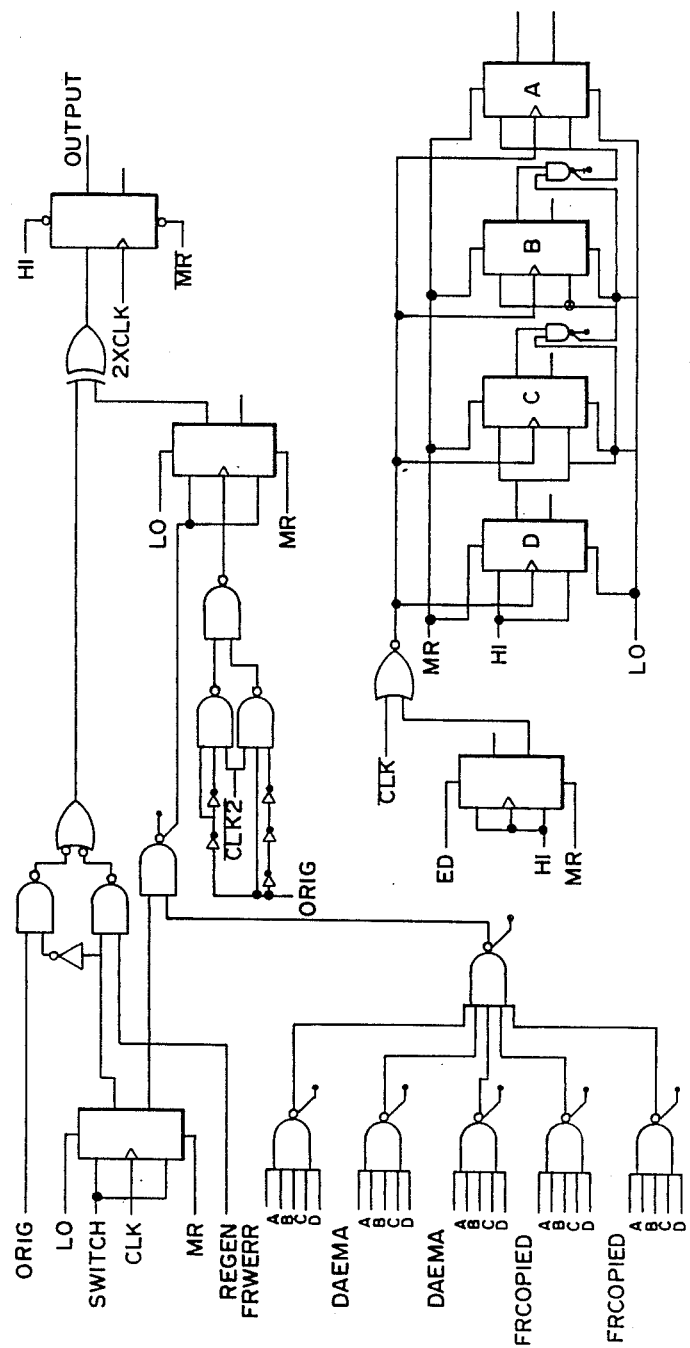
FIG. 3 illustrates a low latency bypass circuit.

FIG. 3 illustrates a specific low latency bypass logic circuit as invented by the inventors to satisfy the arrangement illustrated in FIG. 2. One function of the repeater is to re-clock the output data bits in order to reduce any phase jitter. In the low latency mode, the repeater must also replace the set bits block and set any required flags without first decoding the data bits. Because the data is differentially encoded, a single bit can be flipped by changing the sign of all subsequent bits. This sign change is accomplished with an exclusive-OR gate and a T flip-flop, which is toggled whenever the current bit is to be flipped. The clock for the T flip-flop is derived from the bit-edge signal transitions, which, with differential Manchester coding, only occur on a logic zero. Therefore, the T flip-flop will not toggle whenever the current bit has already been set by a previous station.

With reference to the Standard IEEE 802.5 frame format (4 above), the setting of the error bit is dependent upon the outcome of the CRC calculated at the end of the data field. The CRC circuit uses the bits contained in the frame check sequence (FCS) field to determine if there were any bit errors in the frame. The station therefore has a time of 7 bits between the FCS and the E bit to decide whether the bit should be set. This time interval is reduced when a station is in the low latency mode. Because the incoming data is not decoded, it is always approximately 2 bits ahead of the CRC circuitry. However, the remaining 5 bit interval is still long enough for the station to calculate the CRC and set the error bit if necessary.

Figure 4:
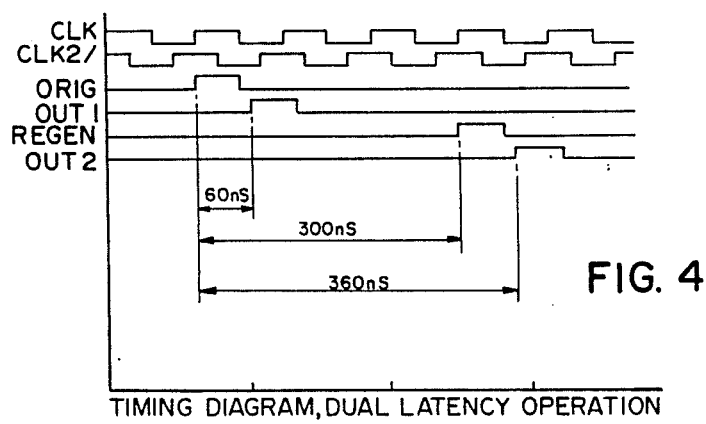
FIG. 4 illustrates a dual latency operation timing diagram.

The inventors have implemented the complete network interface unit, using logic elements with timing parameters consistent with the specifications of a commercial 3 micron CMOS gate array process. We have simulated the entire circuit using a logic simulation program (PC-LOGS) and obtained the timing diagram shown in FIG. 4. The timing diagram shows ORIG, the incoming data stream, OUT 1, the output to the ring with low latency, and OUT 2, the output to the ring with full latency. CLK is set to 10 Mbps. The diagram also shows that, with a bit time of 100 ns, the station latency with full decoding is 3.6 bits, whereas the latency is reduced to 0.6 bits in low latency mode.

With reference to FIG. 3, the signal CLK2/ is derived from the signal CLK by introducing a delay of one-quarter clock period and a signal inversion. This signal is used to produce the signal CLOCK2 in FIG. 2. The signal REGEN corresponds to the signal REGENERATED MANCHESTER in FIG. 2.

These results show that a network interface unit can indeed be designed to operate in a dual latency mode, while maintaining compatibility with an accepted protocol standard, the IEEE 802.5. In addition, the logic simultion results show that a substantial reduction in station latency is possible, using timing parameters representative of a 3 micron CMOS process. In this case, a factor of 6 reduction in station latency was observed.

Analytical Results

Exact analytical results are not known for the case of ordinary or limited-to-one service (only one message is served at a station before the token is released) with non-symmetric traffic distribution. Exact results are also not known for the case of variable station latency (station dependent overheads). However, Ferguson (8 above) has developed approximations and bounds to the mean waiting time E[w] for a token ring operating with an exhaustive service discipline (each stations' message buffer is emptied before the token is released), for the case of station dependent overheads. Ferguson's station dependent overhead, defined as the sum of the station latency and the media propagation delay to the next station, is that difference in overhead caused by token passing when a station has a message and when it does not.

In order to obtain a sense of the potential effects of a dual latency ring on network performance, Ferguson's simulation results for symmetric traffic were compared with Bux's result (2 above) for exhaustive service, symmetric traffic, and fixed station latency. The results in Table 1 below are based on the following assumptions: 20 stations, message arrivals described by a Poisson process, symmetric arrival patterns, message consisting of a fixed length header of 0.5 and an exponential body of 1.0, station latency of 0.005 and 0.5 (dual latency) and 0.5 (fixed latency). The results in Table 1 show a marked difference in E[w] for low values of utilization, consistent with the asymptotic behaviour for symmetric traffic of $E[w] \to \gamma/2$ as $\rho \to 0$, where $\gamma$ is the minimum ring latency and $\rho$ is the utilization. Of significance is the maintenance of a marked reduction in E[w] up to high values of utilization ($\rho$-0.8).

TABLE 1

| Utilization | E[w], Fixed Latency (2) | E[w], Dual Latency (9) |
|---|---|---|
| 0.2 | 6.5 | 1 |
| 0.4 | 9.0 | 2 |
| 0.6 | 13.9 | 5 |
| 0.8 | 28.6 | 16 |

Comparison of dual latency and fixed latency waiting times, exhaustive service, symmetric traffic.

The accepted standards for token ring protocols use ordinary service for its "fairness" or guaranteed access, even though the waiting times are longer than for either gated or exhaustive service. For this reason, we investigated the conditions under which an ordinary service, dual latency ring could be expected to give improved performance. Takagi (9 above) gives a result for the mean waiting time for ordinary service, symmetric traffic, and fixed latency:

$$E[w] = \frac{\rho E[T_p^2]}{2(1 - \rho - \lambda\gamma)E[T_p]} + \frac{(1 + \rho/N)}{(1 - \rho - \lambda\gamma)} \quad (1)$$

Equation (1) gives the mean waiting time E[w] as a function of utilization, $\rho$, moments of the message length, $T_p$, mean message interarrival rate, $\lambda$, ring latency, $\gamma$, and number of stations, N. Message arrivals are assumed described by a Poisson process and message lengths described by an exponential distribution. Equation (1) assumes ordinary service, multiple token operation and symmetric traffic.

The conditions under which it would be expected that dual latency stations would improve the mean waiting time are given by the following considerations. Since the factor $(1-\rho-\lambda\gamma)$ can be expressed as $1-\lambda(E[T_p]+\gamma)$, one would expect a strong dependence of E[w] on $\gamma$, for $E[T_p]$ on the order of $\gamma$, i.e., for relatively short messages and for ring latencies approaching the message length. A strong E[w] dependence on $\gamma$ also occurs when the second term in equation (1) dominates. It is easily shown by the following equation that the second term dominates when $$\frac{VAR\ T_p + (E[T_p])^2}{E[T_p]} < \frac{2\gamma(1 + \rho/N)}{\rho} \quad (2)$$

Equation (2) indicates that a strong E[w] dependence on $\gamma$ occurs for short message lengths with small variance.

Although equations (1) and (2) assume symmetric traffic, it would be expected that a dual latency ring would prove beneficial in the case of a highly unbalanced load, due to the large proportion of stations that would be in the low latency state. These observations are further investigated with the aid of a simulation model, as discussed below.

Simulation Results

The following publications discuss the implementation and use of simulation systems:

11. M. A. Crane, D. L. Iglehart, "Simulating Stable Stochastic Systems, I: General Multiserver Queues", *J. Assoc. Comput. Mach.,* vol. 21, pp. 103–113, January, 1974.

12. M. A. Crane, D. L. Iglehart, "Simulating Stable Stochastic Systems: III. Regenerative Processes and Discrete-Event Simulations", *Operations Research,* vol. 23, pp. 34–45, January–February, 1975.

13. M. A. Crane, A. J. Lemoine, *Lecture Notes in Control and Information Sciences* 4: An Introduction to the Regenerative Method for Simulation Analysis, Springer-Verlag, New York, 1977.

Since explicit analytical results for mean message waiting time using limited-to-one (ordinary) service and arbitrary traffic distribution are currently unavailable, we used discrete event simulation to obtain measures of ring performance. Two discrete event simulation languages were considered for use: GPSS and SIMSCRIPT. GPSS was chosen because of its compact structure that allows minimal changes in source code when simulating different service disciplines and different input conditions.

A pre-processor was written to allow convenient entry of as many types of token ring networks as possible. The options include service disciplines (ordinary, gated, or exhaustive), token transmission (multiple token, single token, or single packet), latency types (dual latency or fixed latency), service time distribution (constant or exponentially distributed), and running method (regenerative method or independent runs).

Two examples are used to compare the performance of a ring with dual latency stations with the performance of a ring with fixed latency stations The parameters chosen for the examples are taken from the measured performance of the 802.5 NIU implementation discussed above. The message lengths and traffic s are chosen to illustrate the effects of dual latency stations on waiting times, based on the above discussion of analytical results. The parameters chosen for the examples are 10 Mbps transmission rate, 4 bits station delay at all times for the fixed latency case, and 1 bit or 4 bits station delay for the dual latency stations, corresponding to an empty message queue or a non-empty queue respectively. The traffic loadings are 40% to each of station 1 and station 8, with the remaining 20% distributed among the other stations.

TABLE II

| P | Ordinary Service Fixed Latency | Ordinary Service Dual Latency | Gated Service Fixed Latency | Exhaustive Service Fixed Latency |
|---|---|---|---|---|
| 0.3 | 3.33 ± 0.31 | 2.31 ± 0.23 | 2.03 | 2.68 |
| 0.4 | 4.66 ± 0.48 | 3.73 ± 0.31 | 4.34 | 3.90 |
| 0.5 | 7.03 ± 0.54 | 6.19 ± 0.53 | 6.33 | 5.59 |
| 0.6 | 10.84 ± 0.88 | 9.09 ± 0.73 | 9.33 | 8.07 |
| 0.7 | 16.67 ± 1.15 | 12.98 ± 1.19 | 14.34 | 12.17 |
| 0.8 | 41.31 ± 7.03 | 28.95 ± 3.58 | 24.34 | 20.28 |
| 0.9 | 110.42 ± 19.03 | 71.37 ± 6.76 | 54.56 | 44.42 |

Mean waiting times at station 1 (units of 10 μs) versus ring utilization, 90% confidence intervals, 20 stations, 2 heavily loaded, 18 lightly loaded The first example (Table II) illustrates the variations in waiting time for the four service disciplines of ordinary service fixed latency, ordinary service dual latency, gated service, and exhaustive service. This example assumes 20 stations, exponentially distributed message lengths with a mean of 512 bits, framing overhead of 48 bits per message, and media propagation delay of 0.5 μs). The waiting times refer to station 1, one of the two heavily loaded stations. The remaining 20% of the load is distributed evenly among the 18 lightly loaded stations.

The second example (Table III below) explores the behaviour of the mean waiting times for the case of a large ring of 40 stations, but with only one-half of the stations active. Again, the traffic is concentrated at stations 1 and 8, each with 40% load. The remaining 20% is distributed evenly among 18 stations, with 20 stations unloaded. The media propagation delay is 1 μs and the message length distribution is the same as example 1. These results, i.e., the mean waiting times at station 1 versus ring utilization, are tabulated below in Table III.

TABLE III

| P | Ordinary Service Fixed Latency | Ordinary Service Dual Latency | Gated Service Fixed Latency | Exhaustive Service Fixed Latency |
|---|---|---|---|---|
| 0.3 | 3.89 ± 0.31 | 2.60 ± 0.26 | 3.61 | 3.21 |
| 0.4 | 5.50 ± 0.59 | 3.72 ± 0.32 | 5.16 | 4.49 |
| 0.5 | 8.13 ± 0.68 | 6.07 ± 0.58 | 7.35 | 6.26 |
| 0.6 | 13.84 ± 1.59 | 10.59 ± 1.07 | 10.65 | 8.88 |
| 0.7 | 23.55 ± 2.21 | 15.88 ± 2.63 | 16.15 | 13.19 |
| 0.8 | 52.59 ± 6.16 | 26.15 ± 3.14 | 27.19 | 21.73 |

Mean waiting times at station 1 (units of 10 μs) versus ring utilization, 90% confidence intervals, 40 stations, 2 heavily loaded, 18 liqhtly loaded, 20 unloaded The results in Tables II and III for exhaustive and gated service were calculated using Everitt's approximation (12 above). We used our GPSS simulation to obtain the results for ordinary service, multiple token operation, fixed and dual station latency. Our simulation calculations are based on the regenerative method introduced by Crane and Iglehart (11, 12, 13 above). This method allows the calculation of confidence intervals with simulation runs of reasonable size. We used 8,000 regenerative cycles or 100,000 messages as bounds on the simulation runs.

Figure 5:
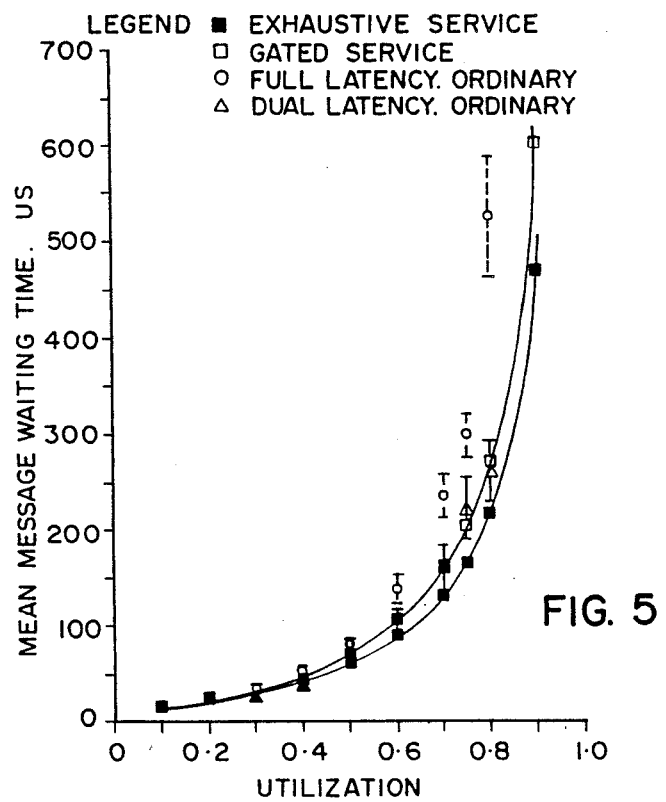
FIG. 5 illustrates a graph depicting mean message waiting time versus ring utilization.

The data of the second example (Table III) is presented in graphical form in FIG. 5. The curves illustrate the ability of the dual latency ring to reduce mean waiting times to values of the order of those for the gated service ring, for relatively short messages and unbalanced traffic, particularly at high values of ring utilization.

The data presented above shows that token rings with dual latency stations can provide superior performance, compared with rings using fixed latency stations. The mean waiting times of the dual ring can approach those of gated service, fixed latency, but without the "unfairness" and lack of guaranteed access of gated service. The dual latency ring is of particular advantage under conditions of short messages and highly unbalanced loading.

Limitations of this Dual Latency Method

The method described in this disclosure has some conceivable limitations. The following three limitations are known to the inventors.

1. The IEEE 802.5 standard specifies that one station shall assume the function of "active monitor", that is, shall monitor the network and continuously check network operation for error conditions. Because of these monitoring requirements, the active monitor cannot enter the low latency state.

2. The delay or latency of the two parts of the circuitry should differ by approximately an integral number of bits. This condition is required to avoid disruption of the clock recovery circuitry of the next station and to allow correct re-clocking of the output data stream. For example, the station could have a low latency value of 0.5 bits and a full latency of 3.5 bits.

3. The IEEE 802.5 standard specifies that the active monitor shall include a latency buffer. This latency buffer has the function of deliberately increasing the total ring latency to at least the token time. For small rings (i.e., small number of stations), the latency buffer will reduce the benefits obtained by the use of the dual latency method. The benefits become greater for large rings. However, these limitations should not detract significantly from the benefits of the overall invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A method of reducing station latency in a token ring network having a bus for sequentially transmitting encoded, addressable tokens between a plurality of individually addressable network stations connected to said bus, said method comprising performing, upon receipt of a token at any of said stations, the steps of:
   (a) determining whether said receiving station has a message waiting for transmission on said bus;
   (b) if said receiving station does have a message waiting for transmission on said bus, decoding said received token for use by said receiving station; and,
   (c) if said receiving station does not have a message waiting for transmission on said bus, recoupling said received token onto said bus for transmission to the next sequential network station;
   wherein said received token includes one or more flags for indicating the availability of said token for message transmission, said method further comprising, in step (c), prior to recoupling of said token onto said bus, clearing said flags.

2. A method of reducing station latency in a token ring network having a bus for sequentially transmitting encoded, addressable tokens between a plurality of individually addressable network stations connected to said bus, said method comprising performing, upon receipt of a token at any of said stations, the steps of:
   (a) determining whether said receiving station has a message waiting for transmission on said bus;
   (b) if said receiving station does have a message waiting for transmission on said bus, decoding said received token for use by said receiving station; and,
   (c) if said receiving station does not have a message waiting for transmission on said bus, recoupling said received token onto said bus for transmission to the next sequential network station;
   wherein said receive token includes one or more flags for indicating the availability of said token for message transmission, said method further comprising, in step (b), prior to recoupling of said token onto said bus, setting said flags.

3. A method of reducing station latency in a token ring network having a bus for sequentially transmitting encoded, addressable tokens between a plurality of individually addressable network stations connected to said bus, said method comprising performing, upon receipt of a token at any of said stations, the steps of:
   (a) determining whether said receiving station has a message waiting for transmission on said bus;
   (b) if said receiving station does have a message waiting for transmission on said bus, decoding said received token for use by said receiving station; and,
   (c) if said receiving station does not have a message waiting for transmission on said bus, recoupling said received token onto said bus for transmission to the next sequential network station;
   further comprising in step (c), prior to recoupling of said token onto said bus, applying a clock signal to said token to synchronize said token with a predefined network clock standard.

4. In a token ring network having a bus for transmitting encoded, addressable tokens sequentially between a plurality of individually addressable network stations connected to said bus, each of said stations comprising:
   (a) a decoder for decoding tokens received from other network stations;
   (b) a receiver coupled to said decoder for receiving decoded tokens addressed to said station;
   (c) an encoder for encoding tokens for transmission to other network stations; and,
   (d) a repeater for coupling encoded, addressed tokens onto said bus;
   the improvement wherein each of said stations further comprises:
   (e) message indicator means for indicating whether or not said station has a message waiting for transmission on said bus; and, (f) bypass means for bypassing said encoder and said decoder by coupling directly to said repeater encoded, addressed tokens which are received by said station if:
  (i) said message indicator means indicates that said station does not have a message waiting for transmission on said bus; and,
  (ii) said received token is not addressed to said station.

5. The improved token ring of claim 4, wherein (a) said received, encoded token includes one or more flags for indicating the availability of said token for message transmission; and, (b) each of said stations further comprises logic means for setting or clearing said flags upon receipt of said token.

6. The improved token ring of claim 4, wherein each of said stations further comprises clock means for synchronizing said encoded, addressed tokens with a predefined network clock standard.

* * * * *